(12) United States Patent
Jung et al.

(10) Patent No.: US 7,929,734 B2
(45) Date of Patent: Apr. 19, 2011

(54) METHOD AND APPARATUS FOR DETECTING EYES IN FACE REGION

(75) Inventors: Sung Uk Jung, Seoul (KR); Yun Su Chung, Daejeon (KR); Jang Hee Yoo, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 981 days.

(21) Appl. No.: 11/760,835

(22) Filed: Jun. 11, 2007

(65) Prior Publication Data

US 2008/0118113 A1 May 22, 2008

(30) Foreign Application Priority Data

Nov. 21, 2006 (KR) .................. 10-2006-0115443

(51) Int. Cl.
*G06K 9/00* (2006.01)
(52) U.S. Cl. ...................... 382/117; 382/118
(58) Field of Classification Search .......... 382/117, 382/118

See application file for complete search history.

(56) References Cited

U.S. PATENT DOCUMENTS

| | | | |
|---|---|---|---|
| 7,466,847 B2 * | 12/2008 | Komura | 382/118 |
| 7,720,302 B2 * | 5/2010 | Aoyama | 382/255 |
| 2005/0259873 A1 * | 11/2005 | Sung et al. | 382/195 |

FOREIGN PATENT DOCUMENTS

| | | |
|---|---|---|
| JP | 10-063850 | 3/1998 |
| JP | 2000-193420 | 7/2000 |
| JP | 2004-078637 | 3/2004 |
| JP | 2005-196241 | 7/2005 |
| JP | 2005-309862 | 11/2005 |
| KR | 1020000060570 | 10/2000 |
| KR | 1020030050306 | 6/2003 |

OTHER PUBLICATIONS

Korean Notice of Patent Grant dated Jan. 29, 2008 for the corresponding application KR10-2006-0115443.

* cited by examiner

*Primary Examiner* — Brian P Werner
(74) *Attorney, Agent, or Firm* — Ladas & Parry LLP

(57) ABSTRACT

Provided are a method and an apparatus for accurately detecting positions of eyes in an input face image. The method includes extracting a symmetric face region from a face image based on magnitude and phase of gradient in each pixel of the face image; detecting available eye positions based on brightness information of the extracted face region; verifying regions around each of the detected eye positions with a classifier which determines whether an input image is an eye image using information obtained by supervised learning on sample images. According to the present invention, faulty eye detection is prevented by removing obscuring elements such as illumination, glasses and hair from an input face image. Also, eye coordinates can be extracted more accurately using an eye classifier.

13 Claims, 8 Drawing Sheets

METHOD AND APPARATUS FOR DETECTING EYES IN FACE REGION

CROSS-REFERENCE TO RELATED PATENT APPLICATION

This application claims the benefit of Korean Patent Application No. 10-2006-0115443, filed on Nov. 21, 2006, in the Korean Intellectual Property Office, the disclosure of which is incorporated herein in its entirety by reference.

BACKGROUND OF THE INVENTION

1. Field of the Invention

The present invention relates to a method and an apparatus for accurately detecting positions of eyes in an input face image, and more particularly, to a method and an apparatus for detecting eyes more promptly and reliably by removing restrictions for detection such as illumination, glasses and hair from an input face image, detecting available eye positions using a gradient descent method, and verifying the detected eye positions using an eye classifier which has obtained information from supervised learning using a learning algorithm.

2. Description of the Related Art

In general, eye detection used for security or user identification is divided into three operations; face detection, eye position extraction, and eye position verification.

For more reliable eye detection, face detection more than anything else has to be performed accurately. Specifically, the accuracy of face identification using all characteristic parts of a face depends on how accurately to detect a face region from an input image. Since recent face detection methods detect the face region very accurately, how accurately to detect eye coordinates from the face region is regarded as an important technical aspect.

Eye detection methods include a method of forming a projection profile on x and y axes of brightness in extracted eye regions and regarding the lowest values on the x and y axes as eye coordinates or a method of detecting eye positions from a plurality pairs of detected available eye positions using a template-matching method or geometric characteristics of the face image.

However, the method of forming a projection profile on x and y axes and detecting eye coordinates is sensitive to brightness of image pixels and cannot detect accurate eye coordinates easily due to hair or eyebrows included in a face image.

The method using a template-matching method is disadvantageous in that standardized eye templates can be varied in accordance with a database used for obtaining the templates and an eye detection rate is determined by a critical value set during binarization.

SUMMARY OF THE INVENTION

The present invention provides a method and an apparatus for detecting eyes in a face region such that faulty eye detection is prevented and eye coordinates are detected accurately by removing obscuring elements such as illumination, glasses and hair from an input face image, and applying a gradient descent method and an eye classifier.

The present invention also provides a method and an apparatus for detecting eyes in a face region such that eye detection speed increases and more reliable real-time eye detection is enabled.

According to an aspect of the present invention, there is provided a method of detecting eyes including extracting a symmetric face region from a face image based on magnitude and phase of gradient in each pixels of face image; detecting available eye positions based on brightness information of the extracted face region; verifying regions around each of the detected eye positions with a classifier which determines whether an input image is an eye image using information obtained by supervised learning on sample images.

According to another aspect of the present invention, there is provided an apparatus for detecting eyes including an image processing unit which extracts a symmetric face region from a face image based on magnitude and phase of gradient in each pixels of face image; an eye position detection unit which detects available eye positions based on brightness information of the extracted face region; an eye position verification unit which verifies regions around each of the detected eye positions with a classifier which determines whether an input image is an eye image using information obtained by supervised learning on sample images.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
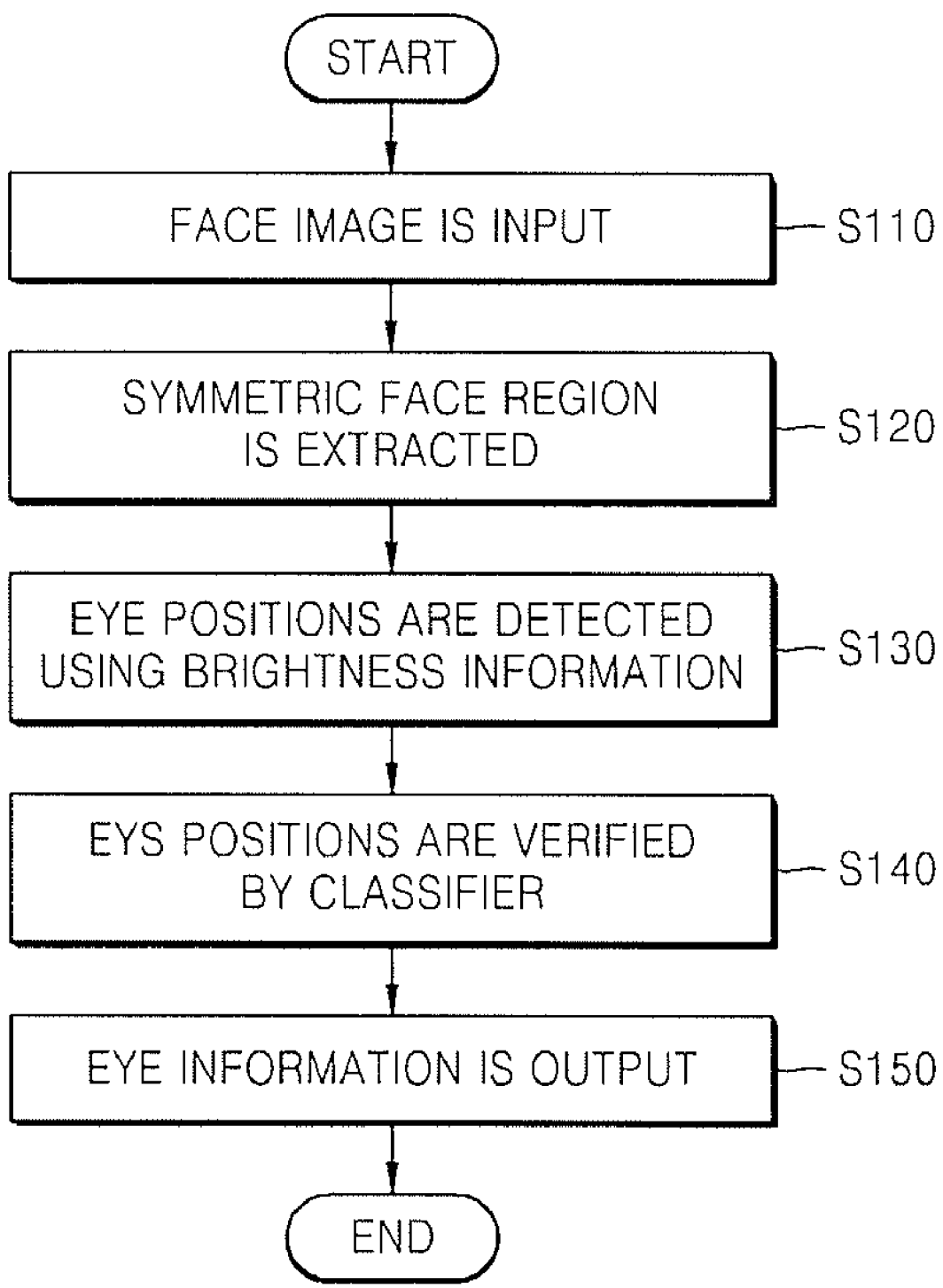
FIG. 1 is a flowchart of a method of detecting eyes in a face region according to an embodiment of the present invention.

Hereinafter, the present invention will be described in detail by explaining embodiments of the invention with reference to the attached drawings. In the drawings, whenever the same element reappears in a subsequent drawing, it is denoted by the same reference numeral. In the following description of the present invention, a detailed description of known functions and configurations incorporated herein will be omitted when it may make the subject matter of the present invention unclear.

FIG. 1 is a flowchart of a method of detecting eyes in a face region according to an embodiment of the present invention. FIGS. 10A through 10E are views of exemplary images output from each process of the method according to an embodiment of the present invention.

Referring to FIG. 1, when a face image is input in S110, a symmetric face region is extracted by image-processing the input face image based on magnitude and phase of gradient in image pixels in S120. Then, available eye positions are detected based on brightness information of the extracted face region in S130, and regions around the detected eye positions are verified with a classifier in S140. Eye detection is completed by outputting final eye information in S150.

Figure 2:
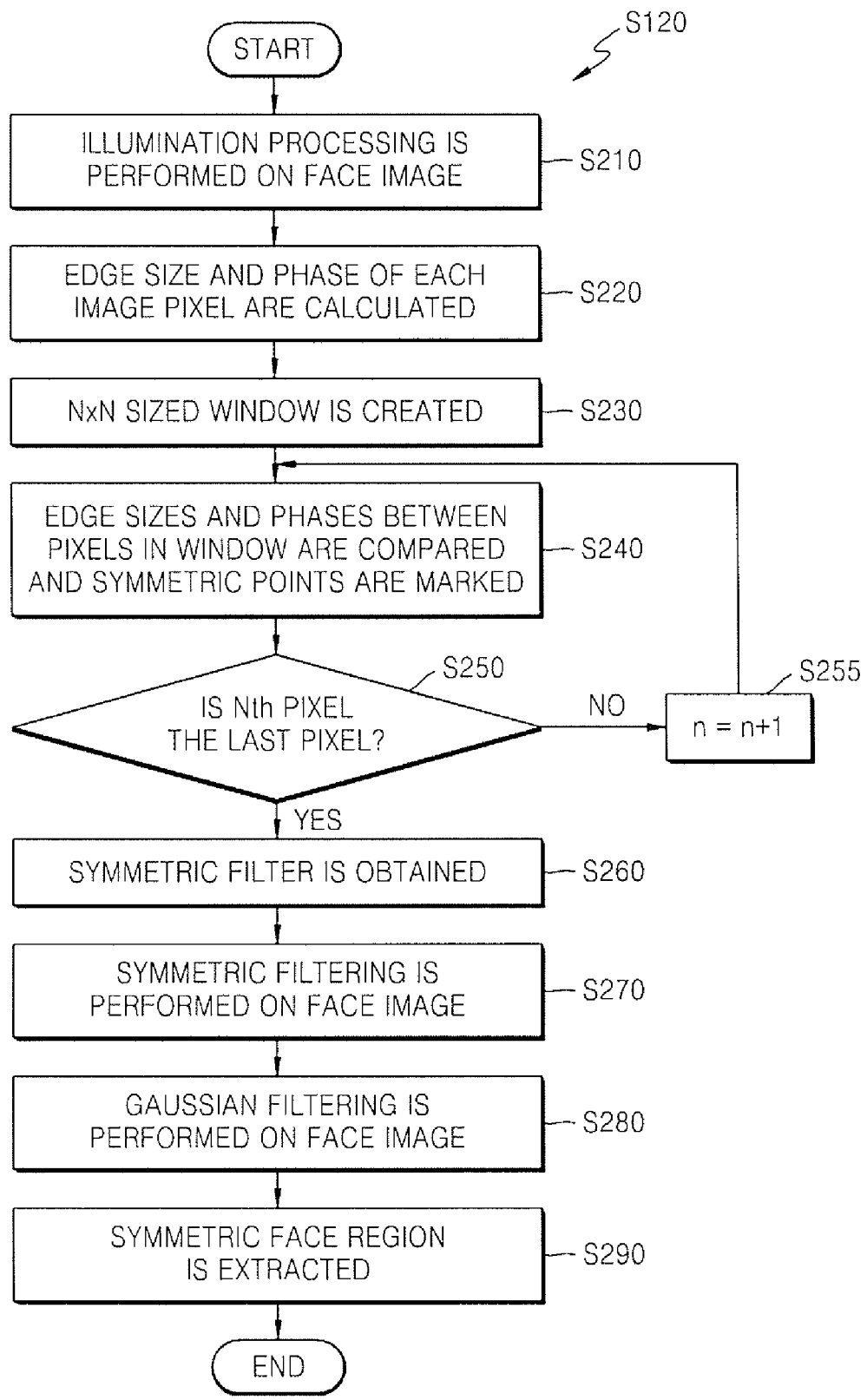
FIG. 2 is a flowchart of a process of extracting a symmetric face region in the method of detecting eyes in a face region, according to an embodiment of the present invention.

FIG. 2 is a flowchart of the process of extracting a symmetric face region (S120) of FIG. 1 using a symmetric extraction method, according to an embodiment of the present invention.

Figure 10A:
FIGS. 10A through 10E are views of exemplary images output from each process of the method of detecting eyes in a face region, according to an embodiment of the present invention.
Figure 10B:

Referring to FIG. 2, when a face image such as the one in FIG. 10A is input, illumination processing is performed so as to remove illumination effects from the input image using conventional methods such as a self quotient image (SQI) method and histogram equalization in S210. A variety of methods of removing the illumination effects can be used in addition to the above-mentioned methods. The removing of the illumination effects can be applied selectively by a user in accordance with the user's environment. An example of the illumination processed image is illustrated in FIG. 10B.

A magnitude and phase of gradient in each pixel in the illumination processed image are calculated in S220. Then, a certain-sized (N×N pixels) window is created on a restricted portion of the illumination processed image in S230.

The created window is applied to a first pixel through a last pixel of the illumination processed image. A pixel corresponding to the center of the window is referred to as a center pixel. Magnitude and phase of gradient of other pixels within the window are calculated with respect to the center pixel and symmetry values calculated using the calculated magnitude and phase of gradient are compared with a previously-set critical value. If the pixels located the same distance from the center pixel have symmetry values greater than the critical value, the pixels are marked as symmetric points in S240.

The window is applied to a last pixel of the illumination processed image and pixels which have symmetry values greater than the critical value are marked as symmetric points, in operations S250 and S255.

Figure 10C:
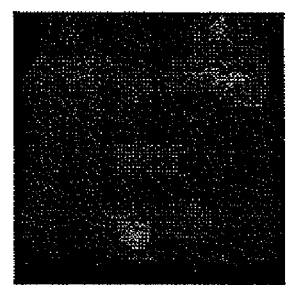

The image in which the symmetric points are marked by the above-described symmetric extraction method is Gaussian filtered and the Gaussian filtered image is obtained as a symmetric filter in S260. Specifically, using the fact that an eye is symmetrical in horizontal and vertical directions, symmetric portions are extracted by a method such as a generalized symmetry transform (GST) method, and the image in which the symmetric portions are extracted is Gaussian filtered and then is used as a filter. An example of the symmetric filter is illustrated in FIG. 10C. The symmetric portions of the face region have high degrees of brightness and other portions have low degrees of brightness. In other words, eyes, nose holes, and lips have high degrees of brightness and other parts which are not necessary for eye detection such as hair and glasses have low degrees of brightness.

Then, the illumination processed image is filtered by applying the symmetric filter in one-to-one correspondence with each pixel of the illumination processed image in S270. Since the symmetric filter has high values only in symmetric portions, portions having high values pass through the filter and portions having low values do not pass through the filter.

The filtered image is Gaussian filtered once again so as to soften the image by removing high frequency components in S280.

The softened image is the final symmetric face image output in the process of FIG. 2 in S290.

The above-described symmetric extraction method is a GST method in which symmetry of an object is measured without previous information on a shape of the object. In the method, the symmetry of each pixel is obtained by the distance between a pair of neighboring pixels, magnitude and phase of gradient of the pair of pixels as follows.

Magnitude and phase of gradient in an arbitrary pixel P can be calculated using Equation 1.

$$\nabla I_p = \left(\frac{\partial I_p}{\partial x}, \frac{\partial I_p}{\partial y}\right) \quad (1)$$

$$\theta_p = \tan^{-1}\frac{\partial I_p/\partial y}{\partial I_p/\partial x}$$

The symmetry $M_r(p)$ of the pixel P can be given by Equations 2 and 3.

$$M_F(p) = \sum_{(q,r)\in\Gamma(p)} h(q,r)a_p a_r \quad (2)$$

where $\Gamma(p)=\{(q,r)|(q+r)/2=p\}$, $a_p=\|\nabla I_p\|$, and $a_q=\|\nabla I_q\|$ are assumed.

$$h(q,r) = \begin{cases} 1 & \theta_p < \|\theta_{threshold}\| \\ 0 & \text{otherwise} \end{cases} \quad (3)$$

where $\theta_{threshold}$ is a critical value of phase of gradient.

$\gamma(p)$ is a set of pairs of neighboring pixels (q,r) located the same distance from the pixel P. That is, $\gamma(p)=(q,r)|(q,r)/2=p$ is assumed. $M_r(p)$ is symmetry of the pixel P.

If a pair of symmetric pixels exists, the pixels can be detected using Equations 1, 2 and 3. Therefore, eyes can be detected using the above equations due to their symmetrical characteristics in horizontal and vertical directions.

Figure 3:
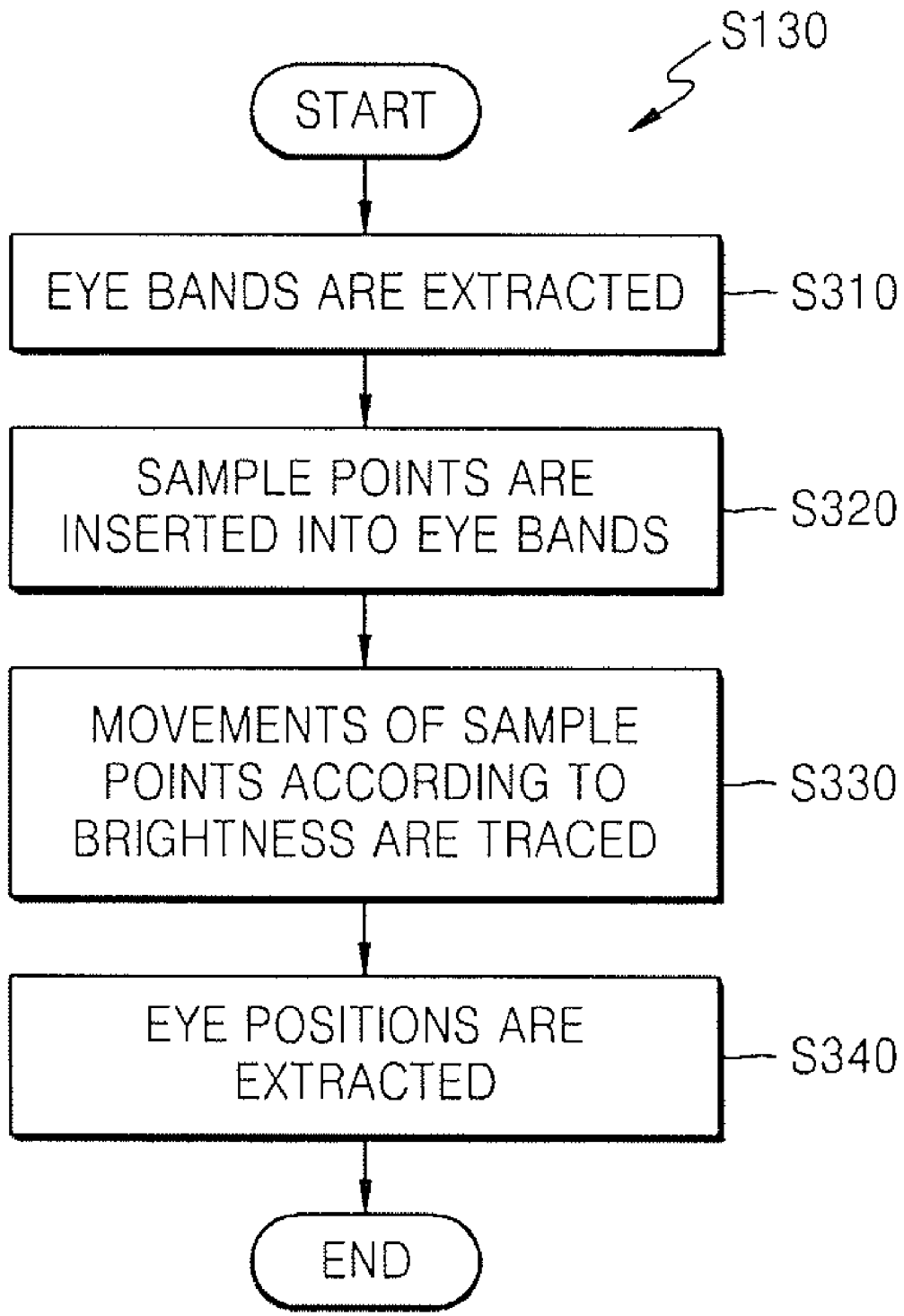
FIG. 3 is a flowchart of a process of detecting eye positions using a gradient descent method in the method of detecting eyes in a face region, according to an embodiment of the present invention.

FIG. 3 is a flowchart of the process of detecting eye positions (S130) of FIG.1 using a gradient descent method, according to an embodiment of the present invention.

Referring to FIG. 3, when the symmetric face image output from S120 of FIG. 1 is input, the face image is divided into four equal regions and eye bands including left and right eye regions are extracted in S310. Since the input image is a face image, the top left region includes the left eye and the top right region includes the right eye.

When the eye bands are extracted, arbitrary sample points are inserted into the eye bands in S320. Then, the movements of the sample points are traced using the gradient descent method in S330. The inserted sample points are converged into portions having the lowest brightness. In general, the eyes have low brightness in the eye bands. Accordingly, pixels to which the sample points are converged are extracted as eye positions in S340.

Figure 10D:
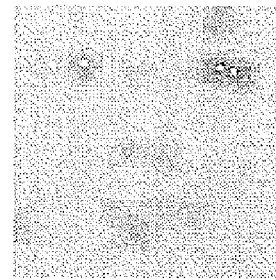

FIG. 10D is an exemplary image of the eye positions extracted using the gradient descent method after inserting the sample points as described above. White points of FIG. 10D are the extracted eye positions.

Assuming that a three-dimensional curve is a soft curve, that is, a convex curve, a local minimum can be found by inserting an arbitrary vector using the gradient descent method. Namely, the vector is converged to a point having the lowest brightness by calculating magnitude and phase of gradient in each pixel. An algorithm of the method is as follows.

1) initialize a, threshold θ, η(·), k←0

2) do k←1

3) a←a−η(k)∇f(a)

4) Until |η(k)∇f(a)|>θ        (4)

where a is a sample point, f(·) is a three-dimensional curve, and η(·) is a weight function.

Figure 4:
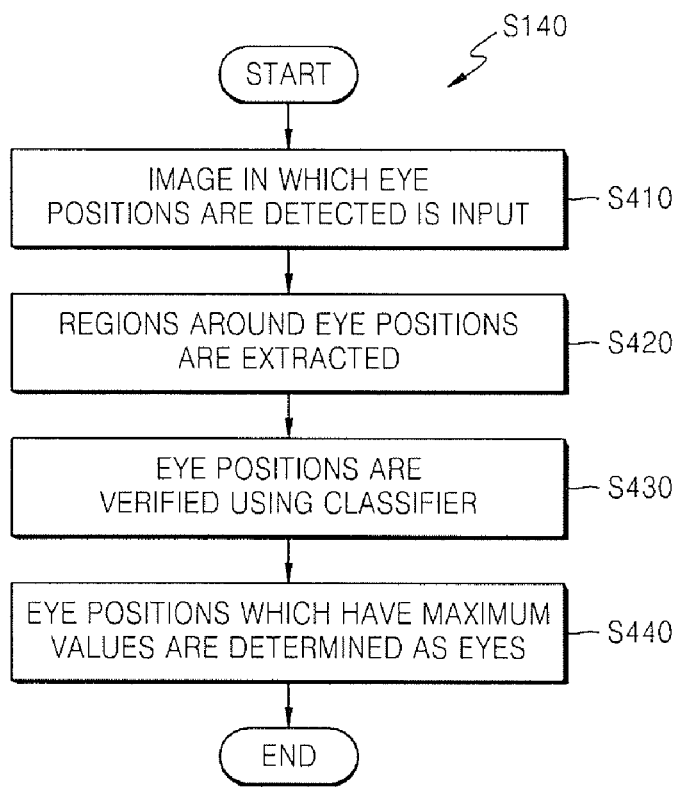
FIG. 4 is a flowchart of a process of verifying eye positions with a classifier in the method of detecting eyes in a face region, according to an embodiment of the present invention.

FIG. 4 is a flowchart of the process of verifying the eye positions using a classifier (S140) of FIG. 1, according to an embodiment of the present invention.

Referring to FIG. 4, an image including the eye positions extracted from S130 of FIG. 3 is input in S410.

Regions around the extracted eye positions are selected in S420.

The selected regions are input to the classifier and then values of each region are calculated in S430. The classifier has information on eye properties obtained from supervised learning of various samples of human eye or non-eye images using a learning algorithm. Adaptive boosting (AdaBoost), a support vector machine (SVM) or a Bayesian classifier can be used as the classifier. Since the above-mentioned classifiers are well-known, detailed descriptions thereof will be omitted.

Eye positions which have maximum values in the above regions are determined as eyes in S440. Since regions having the most similar properties with the eye property information obtained by the supervised learning would have the maximum values, the eyes are determined by verification of the classifier to be the eye positions which have the maximum values.

To output eye information, since people may have different eye sizes, regions around the eye positions have to be repeatedly selected by enlarging or reducing the image and be repeatedly verified using the above method.

Figure 10E:

FIG. 10E is an exemplary image of the eye positions verified by the classifier and output as a result as described above. White points of FIG. 10E are coordinates of the verified eye positions.

Figure 5:
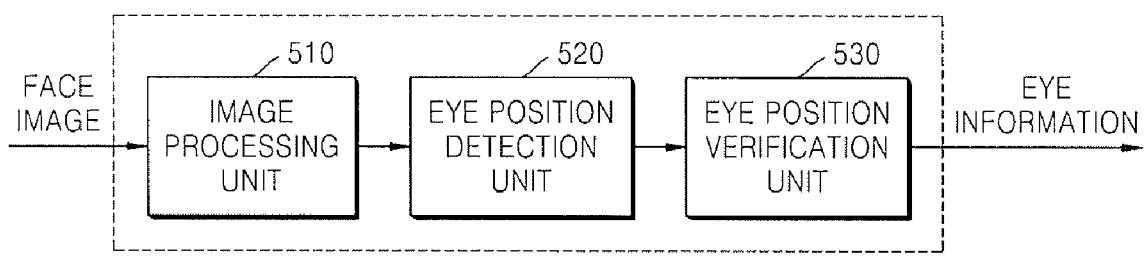
FIG. 5 is a block diagram of an apparatus for detecting eyes in a face region according to an embodiment of the present invention.

FIG. 5 is a block diagram of an apparatus for detecting eyes in a face region according to an embodiment of the present invention.

Referring to FIG. 5, the apparatus for detecting eyes includes an image processing unit 510, an eye position detection unit 520, and an eye position verification unit 530.

The image processing unit 510 extracts a symmetric face region from an input face image by image-processing the input face image based on magnitude and phase of gradient in image pixels. The eye position detection unit 520 detects available eye positions based on brightness information of the extracted face region. The eye position verification unit 530 verifies regions around the detected eye positions with a classifier which determines whether an input image is an eye image using eye property information obtained by supervised learning on sample images, and outputs final eye information.

Figure 6:
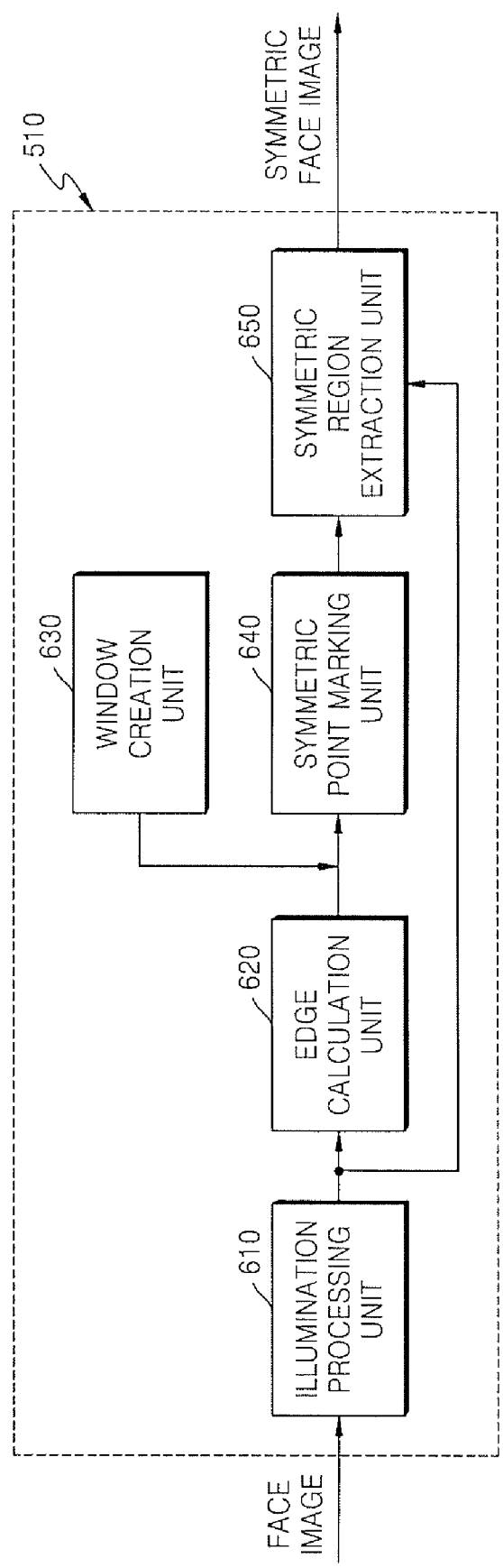
FIG. 6 is a block diagram of an image processing unit of FIG. 5, according to an embodiment of the present invention.
Figure 7:
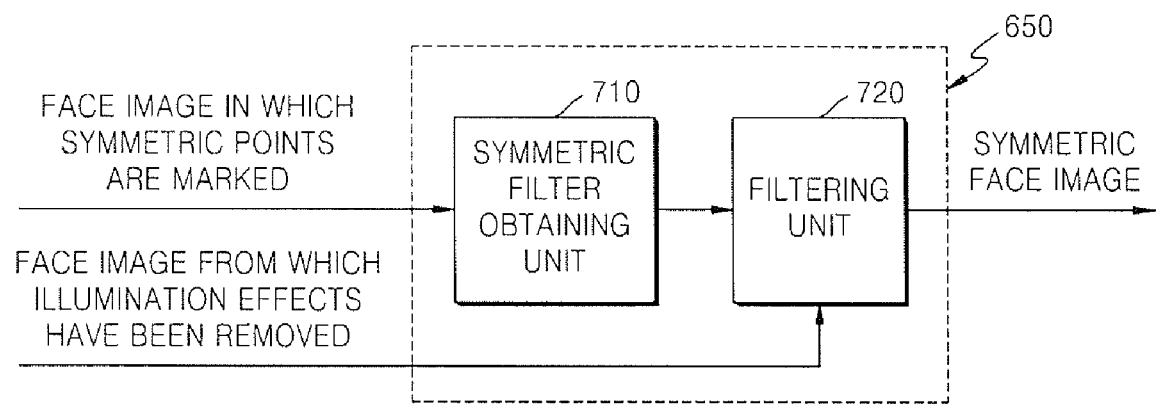
FIG. 7 is a block diagram of a symmetric region extraction unit of FIG. 6, according to an embodiment of the present invention.

FIG. 6 is a block diagram of the image processing unit 510 of FIG. 5, according to an embodiment of the present invention. FIG. 7 is a block diagram of a symmetric region extraction unit 650 of FIG. 6, according to an embodiment of the present invention.

Referring to FIG. 6, the image processing unit 510 includes an illumination processing unit 610, an edge calculation unit 620, a window creation unit 630, a symmetric point marking unit 640 and the symmetric region extraction unit 650.

The illumination processing unit 610 removes illumination effects from the input image. To reduce the effects of illumination on the image, a variety of conventional methods such as self quotient image (SQI) and histogram equalization can be used. The illumination processing unit 610 can be used selectively by a user in accordance with the user's environment.

The edge calculation unit 620 calculates a magnitude and phase of gradient in each pixel of the illumination processed image or a non-illumination processed image which is input.

The window creation unit 630 creates a certain-sized (N×N pixels) window on a restricted portion of the illumination processed image or the input image.

The symmetric point marking unit 640 applies the window to the illumination processed image or the input image from a first pixel of the illumination processed image or the input image, and calculates magnitude and phase of gradient in each pixel in the window with respect to a center pixel of the window. Then the symmetric point marking unit 640 calculates a symmetry value of each pixel using the magnitude and phase of gradient, and compares the calculated value with a previously-set critical value. If pixels located the same distance from a center pixel have symmetry values greater than the critical value, the pixels are marked as a symmetric point.

The window is applied to a last pixel of the illumination processed image or the input image and pixels which have symmetry values greater than the critical value are marked as symmetric points.

The symmetric region extraction unit 650 extracts a symmetric face region by applying a symmetric filter obtained from the face image in which the symmetric points are marked to the illumination processed image or the input image.

Referring to FIG. 7, the symmetric region extraction unit 650 includes a symmetric filter obtaining unit 710 and a filtering unit 720.

The symmetric filter obtaining unit 710 Gaussian filters the face image in which the symmetric points are marked and obtains the Gaussian filtered image as a symmetric filter. An example of the symmetric filter is illustrated in FIG. 10C. Symmetric portions of the face region, such as eyes, a nose, and lips, have high degrees of brightness and other portions which are not symmetric or are non-face regions, such as hair and glasses, have low degrees of brightness.

The filtering unit 720 filters the illumination processed image or the input image by applying the symmetric filter obtained by the symmetric filter obtaining unit 710 in one-to-one correspondence with each pixel of the illumination processed image. Since the symmetric filter has high values only in symmetric portions, portions having high values pass through the filter and portions having low values do not pass through the filter. Then, the filtered image is Gaussian filtered once again so as to soften the image by removing high-frequency components. The softened image is output as the final symmetric face image.

Figure 8:
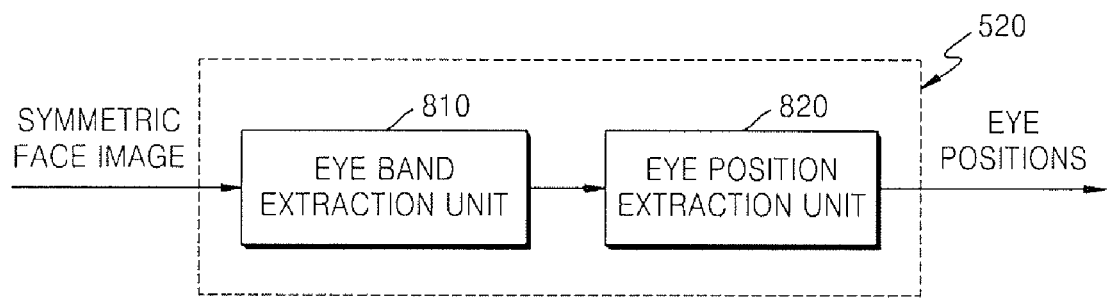
FIG. 8 is a block diagram of an eye position detection unit of FIG. 5, according to an embodiment of the present invention.

FIG. 8 is a block diagram of the eye position detection unit 520 of FIG. 5, according to an embodiment of the present invention.

The eye position detection unit 520 includes an eye band extraction unit 810 and an eye position extraction unit 820.

The eye band extraction unit 810 divides the face image into four equal regions and extracts a left eye band including the left eye and a right eye band including the right eye.

The eye position extraction unit 820 inserts arbitrary sample points in each of the left and right eye bands, and traces the movements of the sample points which move towards pixels having low brightness in accordance with brightness information of the image, using a gradient descent method. The inserted sample points are converged into portions having the lowest brightness. In general, the eyes have low brightness in the eye bands. Accordingly, pixels to which the sample points are converged are extracted as eye positions. The eye positions can be selected more accurately by a three-dimensional analysis as described above.

Figure 9:
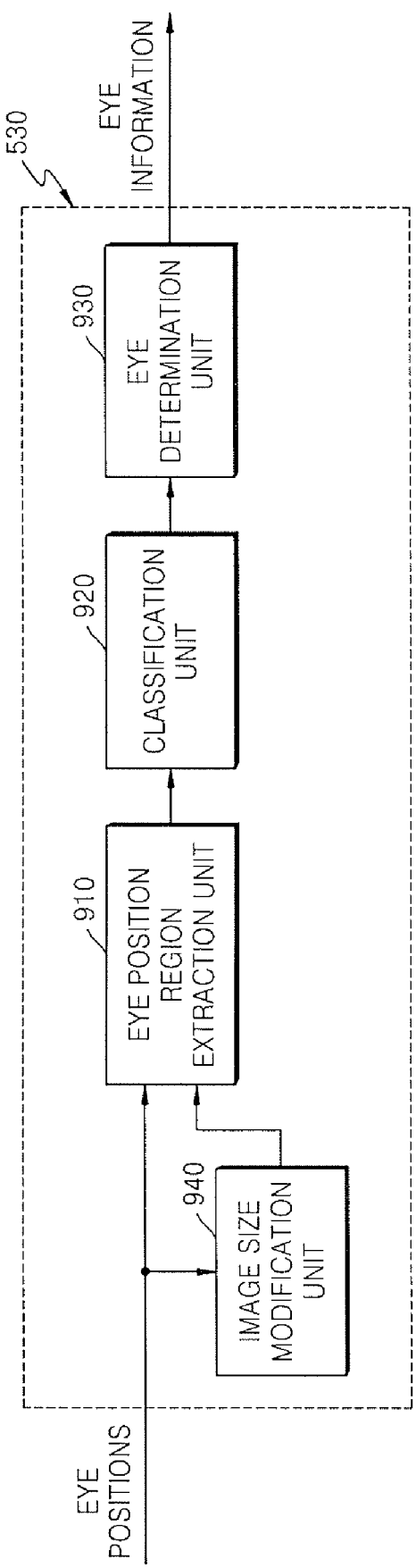
FIG. 9 is a block diagram of an eye position verification unit of FIG. 5, according to an embodiment of the present invention.

FIG. 9 is a block diagram of the eye position verification unit 530 of FIG. 5, according to an embodiment of the present invention.

Referring to FIG. 9, the eye position verification unit 530 includes an eye position region extraction unit 910, a classification unit 920, an eye determination unit 930 and an image size modification unit 940.

The eye position region extraction unit 910 selects regions around each of the eye positions output from the eye position detection unit 520.

The classification unit 920 inputs the selected regions to the classifier and calculates values of the regions. The classifier has information on eye properties obtained from supervised learning of various samples of human eye or non-eye images using a learning algorithm. Adaptive boosting (AdaBoost), a support vector machine (SVM) or a Bayesian classifier can be used as the classifier. Since the above-mentioned classifiers are well-known, detailed descriptions thereof will be omitted.

The eye determination unit 930 determines eye positions which have maximum values among the above regions as eyes. Since regions having the most similar properties with the eye property information obtained by the supervised learning would have the maximum values, the eyes are determined by verification of the classifier to be the eye positions which have the maximum values.

To output the eye information, since people may have different eye sizes, the image size modification unit 940 enlarges or reduces the image, and extraction and verification of the eye position regions of the resized image are repeatedly performed by the eye position region extraction unit 910, the classification unit 920 and the eye determination unit 930.

As described above, faulty eye detection is prevented by removing obscuring elements such as illumination, glasses and hair from an input face image.

Also, eye coordinates can be extracted more accurately by image processing using a gradient descent method and using an eye classifier which has obtained information from supervised learning.

Moreover, eye detection speed and reliability are improved by the above method, thereby enabling real-time eye detection.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of detecting eyes comprising:
   (a) extracting a symmetric face region from a face image based on magnitude and phase of gradient in each pixel of the face image,
      (a1) calculating the magnitude and phase of gradient in each pixel of the face image;
      (a2) creating a certain-sized window smaller than the face image and comparing an magnitude and phase of gradient in each pixel, which are calculated with reference to a center pixel in the window, with a critical value, and marking pixels which have greater magnitude and phases of gradient than the critical value as symmetric points; and
      (a3) applying a symmetric filter obtained from the face image in which the symmetric points are marked to the face image and extracting the symmetric face region from the face image,
   wherein illumination effects are removed from the face image prior to calculating the magnitude and phase of gradient in the each pixel of the face region;
   (b) detecting available eye positions based on brightness information of the extracted face region,
   where the detecting available eye position is done after the illumination effects have been removed from the face image;
   (c) verifying regions around each of the detected eye positions with a classifier which determines whether an input image is an eye image using information obtained by supervised learning on sample images,
   wherein the verifying regions around each of the detected eye positions with the classifier is done after the illumination effects have been removed from the face image.

2. The method of detecting eyes of claim 1, wherein operation (a3) comprises:
   obtaining the symmetric filter by Gaussian filtering the face image in which the symmetric points are marked;
   performing symmetric filtering by applying the symmetric filter in one-to-one correspondence with each pixel of the face image; and
   removing high-frequency components by Gaussian filtering the face image in which the symmetric filtering is performed.

3. The method of detecting eyes of claim 1, wherein operation (b) comprises:
   (b1) extracting left and right eye bands by dividing the extracted face image; and
   (b2) extracting pixels having low brightness in each of the eye bands as available eye positions.

4. The method of detecting eyes of claim 3, wherein operation (b2) comprises:
   inserting arbitrary sample points into the eye bands; and
   tracing the movements of the sample points which are converged into pixels having low brightness in the eye bands.

5. The method of detecting eyes of claim 1, wherein operation (c) comprises:
- (c1) extracting regions around each of the detected eye positions;
- (c2) calculating values of each of the regions by inputting the regions to a classifier which has information on eye properties obtained from supervised learning of various samples of human eye or non-eye images; and
- (c3) determining eye positions which have maximum values in the regions as eyes.

6. The method of detecting eyes of claim 5, the method further comprising (c4) verifying the eye positions by performing operations (c1), (c2) and (c3) repeatedly while modifying the size of the face image in which the eye positions are detected in operation (b).

7. An apparatus for detecting eyes comprising:
- an image processing unit which extracts a symmetric face region by a processor from a face image based on magnitude and phase of gradient in each pixel of the face image,
- an edge calculation unit which calculates a magnitude and phase of gradient in each pixel of the face image;
- a symmetric point marking unit which creates a certain-sized window smaller than the face image and compares magnitude and phase of gradient in each pixel, which are calculated with reference to a center pixel in the window, with a critical value, and marks pixels which have greater magnitude and phase of gradient than the critical value as symmetric points; and
- a symmetric region extraction unit which applies a symmetric filter obtained from the face image in which the symmetric points are marked to the face image and extracts the symmetric face region from the face image;
- an eye position detection unit which detects available eye positions based on brightness information of the extracted face region;
- an eye position verification unit which verifies regions around each of the detected eye positions with a classifier which determines whether an input image is an eye image using information obtained by supervised learning on sample images.

8. The apparatus for detecting eyes of claim 7, the apparatus further comprising an illumination processing unit which removes illumination effects from the face image prior to the calculating of the magnitude and phase of gradient in each pixel of the face image.

9. The apparatus for detecting eyes of claim 7, wherein the symmetric region extraction unit comprises:
- a symmetric filter obtaining unit which obtains the symmetric filter by Gaussian filtering the face image in which the symmetric points are marked;
- a filtering unit which performs symmetric filtering by applying the symmetric filter in one-to-one correspondence with each pixel of the face image, and removes high-frequency components by Gaussian filtering the face image in which the symmetric filtering is performed.

10. The apparatus for detecting eyes of claim 7, wherein the eye position detection unit comprises:
- an eye band extraction unit which extracts left and right eye bands by dividing the extracted face image; and
- an eye position extraction unit which extracts pixels having low brightness in each of the eye bands as available eye positions.

11. The apparatus for detecting eyes of claim 10, wherein the eye position extraction unit extracts eye positions by inserting arbitrary sample points into the eye bands and tracing the movements of the sample points which are converged into pixels having low brightness in the eye bands.

12. The apparatus for detecting eyes of claim 7, the eye position verification unit comprising:
- an eye position region extraction unit which extracts regions around each of the detected eye positions;
- a classification unit which calculates values of each of the regions by inputting the regions to a classifier which has information on eye properties obtained from supervised learning of various samples of human eye or non-eye images; and
- an eye determination unit which determines eye positions which have maximum values in the regions as eyes.

13. The apparatus for detecting eyes of claim 12, the apparatus further comprising an image size modification unit which modifies the size of the face image in which the eye positions are detected.

* * * * *